Dec. 6, 1960    W. A. DANIEL    2,962,790
METHOD OF CENTRIFUGALLY SLIP-CASTING CERAMIC MATERIALS
Filed Sept. 23, 1955    2 Sheets-Sheet 1

INVENTOR.
W. A. Daniel
BY
ATTORNEY

Dec. 6, 1960 W. A. DANIEL 2,962,790
METHOD OF CENTRIFUGALLY SLIP-CASTING CERAMIC MATERIALS
Filed Sept. 23, 1955 2 Sheets-Sheet 2
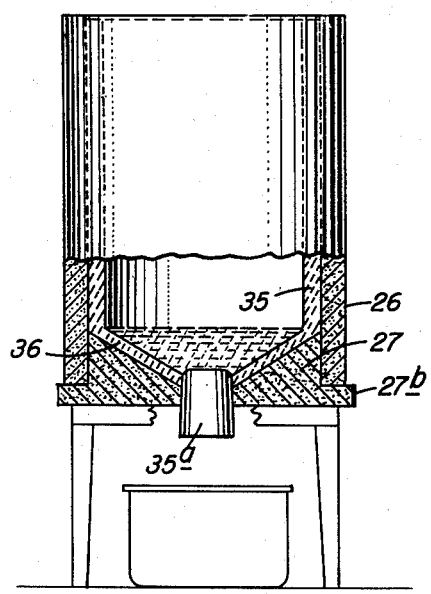
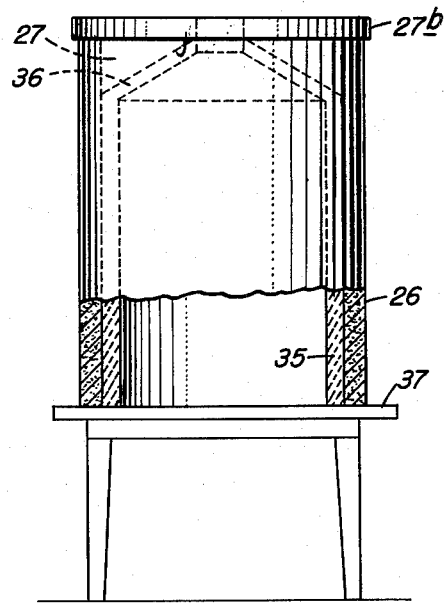
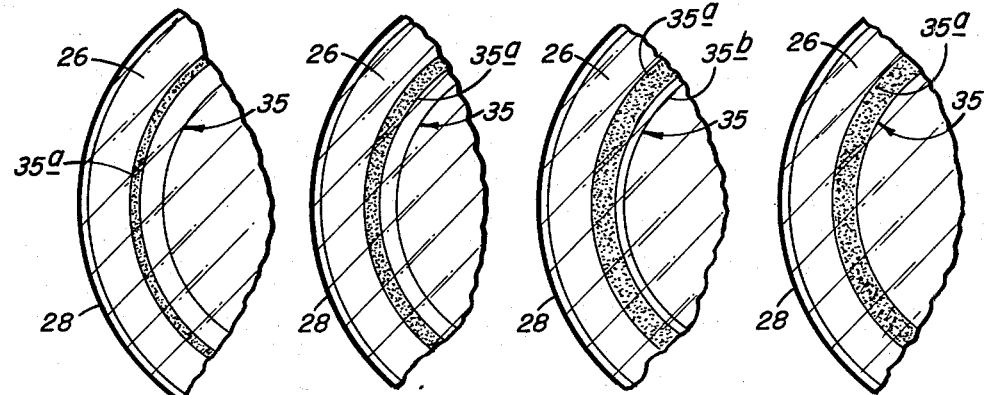
INVENTOR.
W. A. Daniel
BY
ATTORNEY

United States Patent Office 2,962,790
Patented Dec. 6, 1960

2,962,790

METHOD OF CENTRIFUGALLY SLIP-CASTING CERAMIC MATERIALS

William A. Daniel, Van Nuys, Calif., assignor to The Bendix Corporation, a corporation of Delaware Filed Sept. 23, 1955, Ser. No. 536,155

5 Claims. (Cl. 25—156)

This invention relates to the art of slip-casting ceramic objects in water-absorbent molds, and particularly to that phase of the art involving the centrifugal casting of hollow ceramic cylinders.

An object of the invention is to slip-cast ceramic cylinders of high quality that retain their shape during subsequent drying and firing steps.

Another object is to provide a practicable method for centrifugal slip-casting ceramic cylinders that reduces the number of imperfect cylinders (rejects) below that common with prior apparatus.

A feature of the invention is a practicable method, in the centrifugal slip-casting of ceramic cylinders, of determining the optimum duration of the spinning time to produce a good casting.

Another feature is a method that produces uniform distribution of slip of uniform characteristics in a centrifugal mold.

Other more specific objects and features of the invention will appear from the description to follow.

Although the invention is useful in the centrifugal slip-casting of ceramic bodies of various compositions and for various purposes, it will be discussed in connection with the production of ceramic cylinders or rings of materials such as barium titanate for use as electroacoustic transducers. Considerable difficulty has been encountered in the manufacture of relatively large cylinders of this material.

The best previously known method, known as slip-casting, was to introduce the slip (a liquid suspension of the desired ceramic material in finely comminuted form) into a cylindrical plaster of Paris mold and rotate the mold about its axis to first distribute and then retain the slip (by centrifugal force) in a uniform layer against the cylindrical wall of the mold until it became stiff enough, by absorption of water therefrom by the plaster mold, to retain its shape, after which the mold was stood on end to complete the drying at a slow rate. This procedure produced many defective castings (rejects). A large proportion of the castings either distorted as a result of too short a spin period to set the slip, or cracked because of too long a spin period. I have discovered that cracking results from over-spinning, because the centrifugal force urging the water out of the slip dries the inner portion of the slip layer at an excessive rate relative to the outer portion. I have further discovered that the optimum spinning period is very critical, and that the minimum number of rejects results when the spinning is stopped just as the last free water leaves the inner surface of the casting. In this connection, it should be understood that during the spinning operation some free liquid first migrates to the inner surface of the casting by centrifugal action, because the liquid is less dense than the suspended solid particles, but after the latter have been compacted against the mold, the free water at the inner surface migrates through the solid particles and into the plaster mold by capillary attraction and centrifugal force. If the centrifugal force is terminated just as the free liquid leaves the inner surface, further outward migration of liquid continues solely by capillary attraction of the plaster mold, which tends to dry most rapidly that portion of the casting next adjacent to the mold. In other words, the absorption of water by the plaster mold produces a gradient from minimum moisture content at the outer surface of the casting in contact with the mold to maximum moisture at the inner, free surface of the casting. This tends to prevent cracking.

Although the present invention resides in part in the new concept that the optimum spinning period is that just sufficient to dissipate free liquid from the inner surface of the casting, an important feature is the provision of apparatus whereby the time of disappearance of the free liquid can be determined. In previously known centrifugal casting apparatus, it was impossible to observe the casting during the spinning operation, and I have found it impractical to determine in advance what the spinning time must be. In accordance with the invention, I provide a transparent end wall for the cylindrical plaster mold through which the inner surface and also the end surface of the casting that is against the transparent end wall can be observed during the spinning. The visible change in the casting as the spinning proceeds will be described later with reference to the drawing.

A full understanding of the invention may be had from the following detailed description with reference to the drawing, in which:

Fig. 3 is a diagram showing a method of forming an end cap on a cast cylinder.

Fig. 4 is a diagram showing the position of a casting and mold for final drying.

Figs. 5, 5a, 5b and 5c are diagrams showing the appearance of the end of a casting through the transparent end wall of the mold during various stages of the spinning operation.

Figure 1:
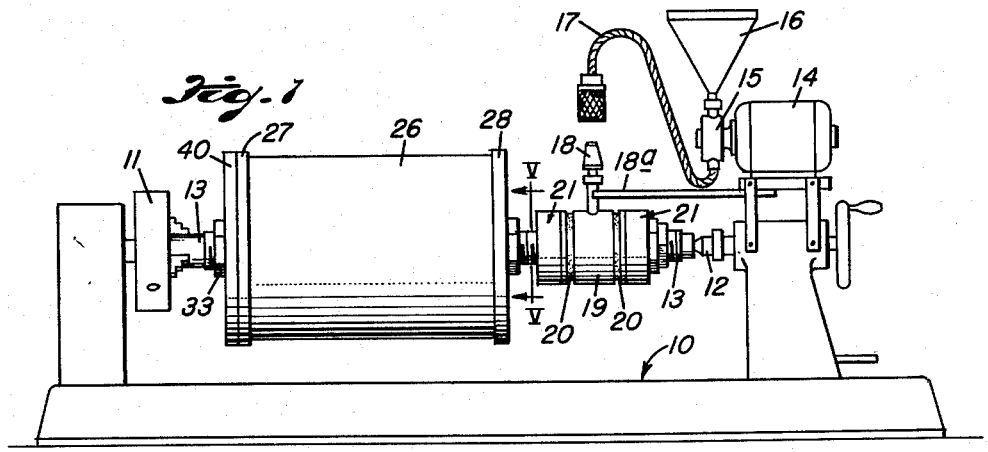
Fig. 1 is a front elevation view of a complete apparatus for practicing the invention.

Referring to Fig. 1, there is shown a portion of a conventional lathe 10 having a chuck 11 adapted to be rotated by a drive mechanism (not shown) and a tail stock 12. Rotatably supported by the chuck 11 and the tail stock 12 is a mold assembly having an arbor 13, one end of which is engaged by the chuck 11 and the other by the tail stock 12. There is mounted on the lathe a motor 14 driving a pump 15 which delivers slip from a funnel 16 through a flexible tube 17 to a fitting 18.

Figure 2:
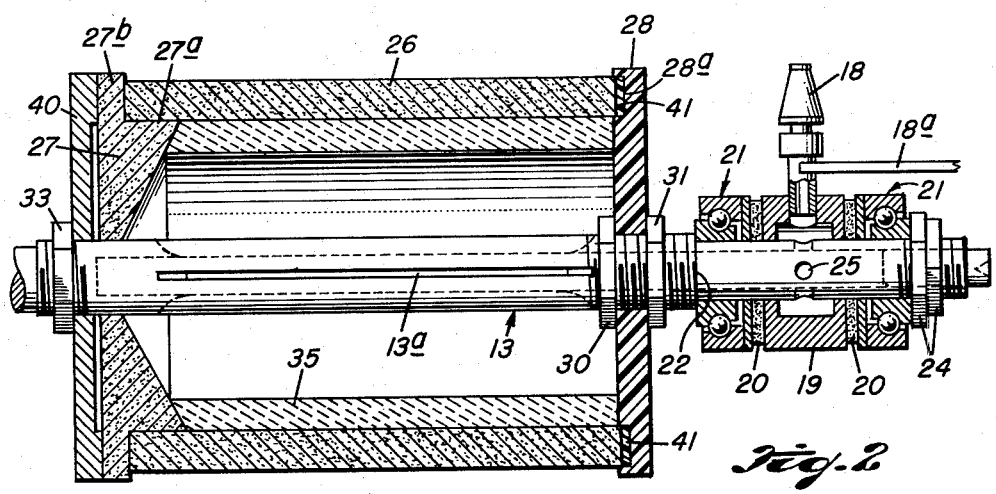
Fig. 2 is a longitudinal sectional view through a portion of the apparatus in Fig. 1.

Referring to Fig. 2 the arbor 13 is hollow intermediate its ends to provide a passage for delivering slip from the connection 18 into the mold. The nipple 18 connects to a hollow bushing 19 encircling the shaft and sealed with respect to the external surface thereof by a pair of packing glands 20 in the form of washers of resilient material which are compressed between the opposite ends of the bushing 19 and a pair of ball thrust bearings 21, 21. Leftward movement of the cone of the left bearing 21 is prevented by a shoulder 22 on the arbor, and the cone of the right bearing 21 is adjusted toward the shoulder 22 by a nut 24 which is threaded onto the arbor. The arbor is provided with one or more radial holes 25 communicating the space within the bushing 19 with the central passage of the arbor.

The mold proper comprises a cylinder 26 of plaster of Paris, or other suitable liquid-absorbent material having the requisite strength, which is supported at its opposite ends by a plaster end wall 27 and a transparent end closure plate 28, respectively.

The end wall 27 may be formed integrally with the cylinder 26, but it is usually more convenient to manufacture them separately. It will be observed that the end wall 27 has a cylindrical peripheral surface 27a that fits into the end of the mold 26, and an outwardly extending flange portion 27b that abuts against the left end of the mold 26.

The transparent end wall 28 may be made of Lucite, a polymer of methyl methacrylate, or glass and may have an annular groove 28a receiving the end of the mold 26 for centering the two with relation to each other. The groove 28a contains a rubber gasket 41 for effecting a seal. The plate 28 has a central aperture for receiving the arbor 13 and may be secured more or less permanently thereto by a pair of nuts 30 and 31, respectively. The end wall 27 also has a central aperture for receiving the arbor 13, and it may be secured firmly against the end of the mold 26 by a pressure plate 40 engaged by a nut 33 threaded on the arbor.

Briefly, the operation of the apparatus described is as follows. The hose connection 17 is connected to the coupling 18 which may be prevented from rotating with the arbor, as by an extension 18a thereon which engages some stationary portion of the lathe, such as the base of the motor 14. The lathe 10 is then energized to drive the chuck 13 at a suitable speed to rotate the mold assembly consisting of the arbor 13 and all of the parts secured thereto. The motor 14 is then started to drive the pump 15, and a predetermined quantity of slip is poured into the funnel 16. This slip is delivered rapidly by the pump 15 through the hose 17 into the hollow arbor 13 and flows from the arbor through longitudinal slits 13a therein within the mold assembly. The slits 13a may be four in number, uniformly distributed circumferentially around the arbor so that the slip is delivered over substantially the full length of the mold 26 at four circumferentially distributed areas thereof and is thereafter quickly forced by the centrifugal force into a layer 35 against the inner surface of the mold 26. This body of slip 35 will hereinafter be referred to as the casting. The spinning is continued while observing the appearance of the casting 35 through the transparent end plate 28 until the casting takes on certain characteristics, whereupon the lathe is stopped, and the hose line 17 is disconnected. The entire mold assembly is then removed from the lathe by disengaging the chuck 11 and the tail stock 12 from the arbor 13. The nut 33 is then removed from the arbor, and the arbor and the transparent plate 28 are removed as a unit from the mold 26 and the end wall 27. The mold is then supported in vertical position with the end wall 27 downward, as shown in Fig. 3, and a plug 35a inserted in the aperture in the end wall to close it. Thereafter, a quantity of slip is poured into the mold sufficient to fill the re-entrant portion of the end wall 27. The capillary attraction of the end wall 27 for the water in the slip causes a layer 36 of thickened slip to build up against the plaster. When this layer 36 has reached the desired thickness, the plug 35a is removed to drain out the excess slip which has not set. The described technique for forming the layer 36 is called "pour-casting." The entire mold is then inverted, as shown in Fig. 4, and left in that position until dry. The casting contracts away from the mold in the drying process, so that at the end thereof the mold can be lifted away from the casting. After further drying, the casting is then ready to be fired in a suitable furnace.

Although the end wall portion 36 of the casting is not essential in all cases, it is highly desirable to stiffen the end of the casting and maintain it in true cylindrical relation during the drying process and the firing process. After the casting has been fired, the end wall 36 is cut off by means of a diamond saw or other suitable equipment, since it has no further function. The open end of the casting is sufficiently restrained against warping during the drying process by the friction between it and the supporting surface against which it rests. This surface is preferably constituted by a smooth greased plate 37.

It is to be understood that although the end wall 36 of the casting is usually desirable, it is not essential in all instances, and the step involving the pour-casting of this end wall may sometimes be eliminated.

As previously indicated, the changes in the casting 35 that occur during the spinning process are observable through the transparent end plate 28. Figs. 5 to 5c, inclusive, show successive stages of the spinning operation and the changes in the appearance of the end wall of the casting that lies against the transparent plate.

Fig. 5 shows the appearance very shortly after the slip is admitted to the mold. At first, the casting 35 appears homogeneous from its outer face lying against the mold 26 to its inner face and has the appearance of the slip, which in the case of barium titanate is a light gray in color or shading. The first change that appears is an outer zone of lighter, almost white, color 35a at the contact of the casting with the mold. This is due to drying of the slip by movement of liquid therefrom into the mold 26. The zone 35a migrates inwardly, as shown in Figs. 5a and 5b. At the same time, an inner zone 35b of substantially clear liquid appears at the inner surface. As previously explained, this results from the fact that the solid particles of the slip are substantially heavier than the liquid and therefore migrate outwardly until they are tightly compacted together against the mold 26. The liquid, being of lesser weight, accumulates on the inner surface, because it cannot migrate through the solid particles as rapidly as the latter are compacted.

As shown in Figs. 5a and 5b, the light zone 35a, where the casting is relatively dry, grows inwardly toward the inner surface as the spinning progresess. In Fig. 5b, the light zone 35a has reached the inner liquid zone 35b. The liquid of zone 35b, however, is constantly migrating through the zone 35a into the plaster mold, and eventually all liquid disappears, as shown in Fig. 5c, and the casting has a uniform appearance from its inner to its outer faces. This is the stage at which the spinning must be stopped.

If the spinning is stopped before the water zone 35b disappears, the casting will not have sufficient rigidity to support itself and will collapse shortly after the spinning is stopped.

On the other hand, if the spinning is continued for any appreciable time after the water zone 35b has disappeared, the inner surface of the casting dries excessively because of the centrifugal action urging the water out through the solid residue. This causes cracks to begin in the inner surface and extend progressively outward toward the outer surface. Any such cracks render the casting useless, because the cracks would cause failure in drying or in firing of the ceramic.

Although observation of the end of the casting through the transparent window, as shown in Figs. 5 to 5c, gives an excellent indication of the various stages through which the casting passes, the time at which the spinning should be stopped can also be determined from observation of the free inner surface of the casting, instead of observation of the end that is in contact with the transparent window. As long as free liquid exists on the inner surface of the casting, it has a shiny appearance, whereas as soon as the liquid disappears, the inner surface has a dead or matte appearance.

Various slip compositions are known in the trade for use in centrifugal casting and are suitable for the present process. A slip that has been found satisfactory for use with the process described for the production of barium titanate ceramic cylinders is as follows:

| | |
|---|---|
| Solids in powdered form _____grams__ | 1000 |
| 1% solution tannic acid _____cc__ | 30 |
| 10% solution ammonium hydroxide _____cc__ | 30 |
| Glycerine _____cc__ | 10 |
| Distilled water _____cc__ | 250 |

The solid component may consist of barium titanate alone, or barium titanate in combination with other titanates according to the properties that are desired in the fired ceramic.

Although for the purpose of explaining the invention a particular embodiment thereof has been shown and described, obvious modifications will occur to a person skilled in the art, and I do not desire to be limited to the exact details shown and described.

I claim:

1. The method of centrifugal slip-casting a hollow ceramic cylinder in an absorbent hollow cylindrical mold rotatable about its axis comprising the steps of: rapidly introducing a predetermined quantity of slip into said mold while rotating the mold with its axis horizontal at a speed sufficient to distribute the slip in a cylindrical layer of uniform thickness against the inner wall of the mold by centrifugal force while the slip remains in fluid condition; continuing the rotation of said mold at a speed sufficient to maintain the slip in said cylindrical layer of uniform thickness until the free liquid component of the slip has just disappeared from the inner surface of said layer by migration therethrough into the mold; stopping rotation of the mold; and placing the mold and its content in vertical position to dry.

2. The improvement in the process of centrifugal slip-casting a hollow ceramic cylinder by rotating about its axis while in horizontal position a hollow, absorbent mold containing a quantity of slip initially in fluid condition at a speed sufficient to first distribute and thereafter maintain the slip in a cylindrical layer against the inner surface of the mold, which comprises terminating the rotation of the mold substantially at the time of disappearance of free liquid component of the slip from the inner surface of said layer.

3. The method of claim 2, including the steps of pour-casting a ceramic end cap on one end of said cylindrical layer immediately after termination of said rotation; drying said layer and integral end cap in said mold in vertical position until the casting is self-supporting, removing the casting from the mold, completely drying it and then firing it while supported in vertical position with its other end on a flat surface, and removing said end cap.

4. The method of centrifugal-casting a hollow ceramic cylinder in an absorbent hollow cylindrical mold rotatable about its axis comprising the steps of: rapidly introducing a predetermined quantity of slip into said mold while rotating the mold about its axis with the axis horizontal at a speed sufficient to, sequentially, by centrifugal force, first distribute the slip in a cylindrical layer of uniform thickness against the inner wall of the mold while the slip remains in fluid condition, second, segregate from the slip a visible inner layer of free liquid component of the slip, and third, gradually dissipate said free liquid layer by migration through the slip to the mold; determining during said rotation the time when said free liquid layer has been dissipated; stopping said rotation at said time; and placing the mold and its content in vertical position to dry.

5. The improvement in the process of centrifugal slip-casting a hollow ceramic cylinder by rotating about its axis in horizontal position a hollow absorbent mold containing a quantity of slip initially in fluid condition at a speed sufficient to first distribute and thereafter maintain the slip in a cylindrical layer against the inner surface of the mold, which comprises terminating the rotation of the mold substantially at the time of disappearance of free liquid component of the slip from the inner surface of said layer as determined by inspection of said inner surface during said rotation.

References Cited in the file of this patent

UNITED STATES PATENTS

| 934,231 | Stubbs | Sept. 14, 1909 |
| 1,364,875 | Fulton | Jan. 11, 1921 |
| 1,630,762 | Randall | May 31, 1927 |
| 1,941,802 | Howell | Jan. 2, 1934 |
| 2,026,624 | Flower | Jan. 7, 1936 |
| 2,296,961 | Thompson | Sept. 29, 1942 |
| 2,696,642 | Kohrn | Dec. 14, 1954 |